US012753265B2

(12) United States Patent
Laufer

(10) Patent No.: US 12,753,265 B2
(45) Date of Patent: Oct. 6, 2026

(54) PROCESS FOR PREPARING CARBODIIMIDES

(71) Applicant: LANXESS Deutschland GmbH, Cologne (DE)

(72) Inventor: Wilhelm Laufer, Ellerstadt (DE)

(73) Assignee: LANXESS Deutschland GmbH, Cologne (DE)

( * ) Notice: Subject to any disclaimer, the term of this patent is extended or adjusted under 35 U.S.C. 154(b) by 410 days.

(21) Appl. No.: 18/287,720

(22) PCT Filed: Apr. 11, 2022

(86) PCT No.: PCT/EP2022/059638
§ 371 (c)(1),
(2) Date: Oct. 20, 2023

(87) PCT Pub. No.: WO2022/223352
PCT Pub. Date: Oct. 27, 2022

(65) Prior Publication Data

US 2024/0209136 A1 Jun. 27, 2024

(30) Foreign Application Priority Data

Apr. 20, 2021 (EP) .................................... 21169385

(51) Int. Cl.
*C08G 18/09* (2006.01)
*C08G 18/08* (2006.01)
*C08G 18/16* (2006.01)

(52) U.S. Cl.
CPC ....... *C08G 18/095* (2013.01); *C08G 18/0852* (2013.01); *C08G 18/166* (2013.01)

(58) Field of Classification Search
CPC .............. C08G 18/095; C08G 18/0852; C08G 18/166
See application file for complete search history.

(56) References Cited

U.S. PATENT DOCUMENTS 5,246,993 A * 9/1993 Scherzer .............. C08G 18/797 564/252
5,498,747 A * 3/1996 Pohl ..................... C08G 18/283 528/80
2005/0020798 A1 1/2005 Bartz et al.
2012/0123062 A1* 5/2012 Laufer ................. C08G 18/025 525/418
2015/0225336 A1* 8/2015 Haeberle ................ C08G 69/00 564/252
2015/0232605 A1* 8/2015 Bubolz ................ C08G 18/025 528/48
2016/0096951 A1 4/2016 Laufer
2020/0331849 A1 10/2020 Laufer

FOREIGN PATENT DOCUMENTS

DE 1130594 B 5/1962
JP H08217743 A 8/1996
JP 09-24801 H 9/1997

OTHER PUBLICATIONS

Angew. Chem. 1 74. Jahrg. 1962 | Nr. 21, pp. 801-806.
Angew. Chem. 93, (1981) Verlag Chemie GmbH, 0-6940 Weinheim, 1981, pp. 855-866.
Rahman, A.K. Fazlur, et al., Tetrahedron Letters 48 (2007), , Elsevier, available from the Internet at www.sciencedirect.com, pp. 6002-6004.
European Search Report from corresponding European Application No. 21169385, dated Oct. 4, 2021, two pages.

* cited by examiner

*Primary Examiner* — Michael L Leonard

(74) *Attorney, Agent, or Firm* — Nicanor A. Kohncke; Christopher L. McDavid; Alyson J. DiLena

(57) ABSTRACT

The invention relates to a novel process for preparing carbodiimides comprising the steps of a) carbodiimidization of isocyanates in the presence of a catalyst,
b) separation of the catalyst and/or monomeric isocyanate from the carbodiimide by distillation or extraction to obtain a crude carbodiimide comprising monomeric isocyanate,
c) addition of one or more alcohols and partial or complete reaction of the alcohol with the monomeric isocyanate of the crude carbodiimide.

15 Claims, No Drawings

PROCESS FOR PREPARING CARBODIIMIDES

The invention relates to a novel process for preparing carbodiimides having a reduced residual isocyanate monomer content.

Carbodiimides have proven useful in many applications, for example as hydrolysis inhibitors for thermoplastics, polyols, polyurethanes, triglycerides and lubricating oils, etc.

The prior art synthesis of carbodiimides typically proceeds from isocyanates, which are carbodiimidized under basic or heterocyclic catalysis with elimination of $CO_2$. This allows mono- or polyfunctional isocyanates to be converted into monomeric or polymeric carbodiimides.

The catalysts typically used are alkali metal or alkaline earth metal compounds and also heterocyclic compounds containing phosphorus. Corresponding catalysts are for example described in Angew. Chem. 1962, 74, 801-806 and Angew. Chem. 1981, 93, 855-866.

The removal of the isocyanates used as raw material from the product after the carbodiimidization has been performed is associated with high complexity, especially when preparing polymeric carbodiimides. The target of reducing the residual isocyanate monomer content to significantly below 0.1% by weight, without impairing the product quality (especially the colour number), is generally achieved only by repeated crystallization operations with significant losses in yield. As an alternative, as described in EP 1451239, carbodiimides containing isocyanate groups and urethane groups and having a low residual isocyanate monomer content can be prepared by repeatedly distilling off the monomers via short-path evaporators; however, this is time- and cost-intensive.

An object of the present invention was therefore that of providing an improved process for preparing carbodiimides having a reduced content of isocyanates, which to a very great extent avoids the above disadvantages of the prior art and enables high yields with economic feasibility and a high product quality.

Surprisingly, it has now been found that the aforementioned object is achieved by a process for preparing carbodiimides of the formula (I)

$$R^{III}-\!(-N{=}C{=}N-R^{I}-)_n-N{=}C{=}N-R^{II}, \qquad \text{(I)}$$

in which n is a number from 1 to 500, preferably 2 to 50, very particularly preferably 4 to 20, $R^I$ is $C_1$-$C_{24}$ alkylenes and/or $C_5$-$C_{12}$ cycloalkylenes, $C_1$-$C_{12}$-alkyl-substituted or $C_1$-$C_{24}$-oxyalkyl-substituted cycloalkylenes, $C_1$-$C_{12}$-alkyl-substituted arylenes, $C_1$-$C_{24}$-oxyalkyl-substituted arylenes, $C_7$-$C_{18}$-alkylaryl-substituted arylenes and optionally $C_1$-$C_{12}$-alkyl-substituted arylenes bridged via $C_1$-$C_8$ alkylene groups and having a total of 8 to 30 carbon atoms, and arylene and $R^{II}$, $R^{III}$ identically or independently of one another are $C_1$-$C_{24}$-alkyl- and/or $C_5$-$C_{24}$-cyclo- or $C_1$-$C_{12}$-alkyl-substituted or $C_1$-$C_{24}$-oxyalkyl-substituted cycloalkyls, $C_1$-$C_{12}$-alkyl-substituted or $C_1$-$C_{24}$-oxyalkyl-substituted aryls, $C_7$-$C_{18}$-alkylaryl-substituted aryls and optionally $C_1$-$C_{12}$-alkyl-substituted aryls bridged via $C_1$-$C_8$ alkylene groups and having a total of 8 to 30 carbon atoms, and aryl, comprising the following steps of:

a) carbodiimidization of isocyanates in the presence of a catalyst to give a reaction mixture comprising carbodiimide and monomeric isocyanate, b) at least partial separation of the catalyst and/or monomeric isocyanate from the reaction mixture comprising carbodiimide and monomeric isocyanate by distillation or extraction to obtain a crude carbodiimide comprising monomeric isocyanate, c) addition of one or more alcohols to the crude carbodiimide comprising monomeric isocyanate and partial or complete reaction of the alcohol with the monomeric isocyanate of the crude carbodiimide.

The isocyanates used here in step a) are monomeric compounds of the formulae OCN—$R^I$—NCO, OCN—$R^{II}$ and OCN—$R^{III}$.

In an alternative embodiment, in step a) compounds of the formula OCN—$R^I$—NCO in an already oligomerized or polymerized form, i.e. as compounds of the formula OCN—$R^I$—(—N═C═N—$R^I$—)$_{(n-1)}$—NCO, are carbodiimidized together with compounds of the formulae OCN—$R^{II}$ and OCN—$R^{III}$.

In further alternative embodiments, in step a) the compounds of the formula OCN—$R^I$—NCO are used in already oligomerized or polymerized form and in a form already terminated at one end. In these cases, i.e. compounds of the formula $R^{III}$—(—N═C═N—$R^I$—)$_n$—NCO are carbodiimidized with compounds of the formula OCN—$R^1$, or compounds of the formula $R^{II}$—(—N═C═N—$R^I$—)$_n$—NCO are carbodiimidized with compounds of the formula OCN—$R^I$.

The optionally $C_1$-$C_{12}$-alkyl-substituted $C_6$-$C_{10}$ arylenes bridged via alkylene groups and having a total of 8 to 30 carbon atoms have the general structure -alkylene-arylene-alkylene-, where the alkylenes may be linear or branched and the arylene group may have up to four $C_1$-$C_{12}$ alkyl substituents, with the proviso that the total number of carbon atoms is not more than 30.

Preference is given here to $C_6$-$C_{10}$ arylenes that are bridged via alkylene groups and have no alkyl groups on the arylene group, and in which the two alkylene groups in each case have 1 to 6 carbon atoms.

In a preferred embodiment, $R^I$ is $C_1$-$C_{12}$-alkyl-substituted $C_6$-$C_{12}$ arylenes, preferably $C_1$-$C_4$-alkyl-substituted $C_6$-$C_{12}$ arylenes, particularly preferably mono- to tri-$C_1$-$C_4$-alkyl-substituted $C_6$ arylenes, and very particularly preferably di- and/or triisopropylphenylene.

In a preferred embodiment, $R^{II}$ and $R^{III}$ independently of one another are $C_1$-$C_{12}$-alkyl-substituted $C_6$-$C_{12}$ aryls, preferably $C_1$-$C_4$-alkyl-substituted $C_6$-$C_{12}$ aryls, particularly preferably mono- to tri-$C_1$-$C_4$-alkyl-substituted $C_6$ aryls, and very particularly preferably di- and/or triisopropylphenyl.

In a further preferred embodiment, $R^I$ is $C_1$-$C_{12}$-alkyl-substituted $C_6$-$C_{12}$ arylenes and $R^{II}$ and $R^{III}$ independently of one another are $C_1$-$C_{12}$-alkyl-substituted $C_6$-$C_{12}$ aryls.

In a further preferred embodiment, $R^I$ is $C_1$-$C_4$-alkyl-substituted $C_6$-$C_{12}$ arylenes and $R^{II}$ and $R^{III}$ independently of one another are $C_1$-$C_4$-alkyl-substituted $C_6$-$C_{12}$ aryls.

In a further preferred embodiment, $R^I$ is mono- to tri-$C_1$-$C_4$-alkyl-substituted $C_6$ arylenes and $R^{II}$ and $R^{III}$ independently of one another are mono- to tri-$C_1$-$C_4$-alkyl-substituted $C_6$ aryls.

In a further preferred embodiment, $R^I$ is di- and/or triisopropylphenylene and $R^{II}$ and $R^{III}$ independently of one another are di- and/or triisopropylphenyl.

In a preferred embodiment, the carbodiimides correspond to the formula (II), (II)

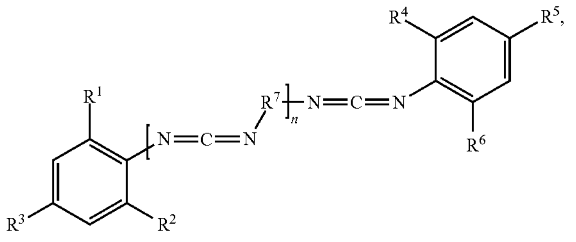

in which $R^1$, $R^2$, $R^3$, $R^4$, $R^5$ and $R^6$ identically or independently of one another are H, $C_1$-$C_{20}$ alkyl, $C_3$-$C_{20}$ cycloalkyl, $C_6$-$C_{15}$ aryl and/or $C_7$-$C_{15}$ aralkyl, $R^7$=$C_1$-$C_{18}$ alkylene, $C_5$-$C_{18}$ cycloalkylene, $C_1$-$C_{20}$-alkyl-substituted arylene and/or $C_7$-$C_{18}$ aralkylene, preferably $C_1$-$C_8$-alkyl-substituted arylene and/or $C_7$-$C_{18}$ aralkylene, and n is a number in the range from 1 to 500.

Preferably, n is a number in the range from 1 to 50, preferably from 3-20.

In the above-mentioned embodiments of the invention, there may also arise mixtures of compounds of the formula (I) and/or (II) having different values for n. In this case, fractions may also result for n when determining the average value.

The carbodiimidization of isocyanates in the presence of a catalyst in step a) of the process according to the invention is typically effected in a condensation reaction with elimination of $CO_2$, as described, for example, in Angew. Chem. 93, pp. 855-866 (1981) or DE-A-11 30 594 or Tetrahedron Letters 48 (2007), pp. 6002-6004.

The carbodiimidization can be conducted either in substance or in a solvent. It is likewise possible to first begin the carbodiimidization in substance and to add a solvent during the reaction. Suitable solvents can be easily determined by those skilled in the art. Examples of such solvents include petroleum ether, benzene and/or alkylbenzenes.

The isocyanates used are particularly preferably 1,3,5-triisopropylphenyl diisocyanate (TRIDI), 2,6-diisopropylphenyl isocyanate (DIPI) or 2,4,6-triisopropylphenyl isocyanate (TRIPI).

In one embodiment of the invention, the catalysts preferred for the carbodiimidization of the isocyanates to carbodiimides of the formula (I) in step a) are strong bases or phosphorus compounds. Preference is given to using phospholene oxides, phospholidines or phospholine oxides and also the corresponding sulfides. Further catalysts that may be used are tertiary amines, basic metal compounds, alkali metal and alkaline earth metal oxides, hydroxides, alkoxides or phenoxides, metal carboxylates and non-basic organometallic compounds. As catalyst, particular preference is given to alkylphospholene oxides such as methylphospholene oxide.

The reaction (carbodiimidization) is preferably conducted in a temperature range from 140° C. to 200° C., particularly preferably from 160° C. to 180° C.

In a further embodiment of the invention, the reaction product from step a) is filtered between step a) and step b).

The at least partial separation of the catalyst and/or monomeric isocyanate in step b) aims to achieve the removal of the majority of these substances. Taking process efficiency into consideration, it is accepted here that the monomeric isocyanate is not completely separated off. The separation can be effected by distillation or extraction, with preference being given to distillation. Any solvent possibly used in the carbodiimidization may also be separated simply in the distillation. The distillation in step b) is preferably effected at temperatures of from 140° C. to 200° C., particularly preferably at 160° C.-180° C. It is generally conducted under reduced pressure at a pressure of from 0.1 to 50 mbar, preferably 1-30 mbar, particularly preferably 10-20 mbar. In a preferred embodiment, the distillation is effected batchwise in a stirred reactor.

The addition and/or reaction of the alcohol in step c) is preferably effected at temperatures of from 140° C. to 200° C., particularly preferably from 160° C. to 180° C. Particularly preferably, both the addition and the reaction of the alcohol in step c) take place at temperatures in the range from 140° C. to 200° C., most preferably from 160° C. to 180° C.

Typically, in step c), based on the amount of carbodiimide present, 0.1%-5% by weight, preferably 0.2%-2% by weight, particularly preferably 0.3%-0.5% by weight, of alcohol(s) is added.

Preferably, the alcohols used are aliphatic and/or aromatic alcohols, preferably linear, branched and/or cyclic aliphatic $C_6$-$C_{18}$ alcohols, particularly preferably n-octanol, isooctanol, dodecanol, 2-ethylhexanol, oleyl alcohol, stearyl alcohol and/or cyclohexanol.

Step c) may be followed by a distillation in order to remove any excess of alcohol optionally present.

The carbodiimides obtained by the process according to the invention typically have a content of monomeric isocyanate of less than 1000 ppm, preferably less than 750 ppm, particularly preferably less than 500 ppm, more preferably less than 300 ppm and most preferably less than 100 ppm.

The examples which follow serve to elucidate the invention but have no limiting effect.

WORKING EXAMPLES

Determination of the Residual Isocyanate Monomer Content

The residual isocyanate monomer content was determined by means of HPLC after reaction with a reagent solution (1-pyridyl-2-piperazine in 100 ml of THF). The eluent used was a mixture of ammonium acetate solution and methanol. Calibration was performed beforehand with various concentrations of the monomeric isocyanate.

Example carbodiimide: Carbodiimide of the formula (II) with $R^7$=triisopropylphenylene, $R^1$, $R^2$, $R^3$, $R^4$, $R^5$ and $R^6$=isopropyl and n=approx. 18

Example 1: Carbodiimidization

A mixture of 1,3,5-triisopropylphenyl diisocyanate (TRIDI) and 2,4,6-triisopropylphenyl isocyanate (TRIPI) was carbodiimidized in the presence of approx. 0.2% of methylphospholene oxide at 160° C., until an NCO content of <1% was achieved. The reaction product was distilled for 2 h at 160° C. and 10 mbar.

Example 2: Batch Distillation

The carbodiimide from Example 1 was distilled in a stainless steel tank for 5 h over a short distillation bridge.

The temperatures in the distillation tank were in a range from 160° C. to 180° C., the final pressure was approx. 10 mbar.

Example 3: Distillation Via Thin-Film/Short-Path Evaporator

The carbodiimide from Example 1 was distilled by means of a thin-film/short-path evaporator combination at approx. 180° C. and 1 mbar.

Example 4: Recrystallization

The carbodiimide from Example 1 was dissolved in toluene at 60° C. in a stainless steel tank and then recrystallized from acetone at 10-20° C. After filtration, the pulverulent carbodiimide was dried for several hours in a dryer at a reduced pressure of 10 mbar.

Example 5: Reaction with Alcohol

To the carbodiimide from Example 1 was added in a stainless steel tank 0.5% 2-ethylhexanol and the mixture was stirred at 160° C. for approx. 30 min.

Example 6: Reaction with Alcohol

To the carbodiimide from Example 1 was added in a stainless steel tank 2.0% 2-ethylhexanol and the mixture was stirred at 160° C. for approx. 30 min.

The residual content of monomeric isocyanate was determined by means of HPLC. The colour was determined according to the CIE L*a*b* method ISO 11664-4. The b value was evaluated.

The results are listed in Table 1 below.

TABLE 1

| | Characteristics | | |
|---|---|---|---|
| Example | Colour, CIELab | Monomeric isocyanate TRIPI in ppm, (target <1000 ppm) | Yield (%) |
| 1 (comp.) | 6 | approx. 1800 | >95 |
| 2 (comp.) | 10 | approx. 1300 | >95 |
| 3 (comp.) | 8 | <100 | >90 |
| 4 (comp.) | <4 | <100 | <60 |
| 5 (inv.) | 6 | approx. 700 | >95 |
| 6 (inv.) | 6 | <100 | >95 |

comp.: comparative example,
inv.: according to the invention

As can be seen from Table 1, the residual isocyanate monomer content cannot be achieved in the simple batch distillation method even after very long distillation times. Moreover, this results in a marked deterioration in the product colour. The desired quality characteristics are first achieved by means of recrystallization or by means of a thin-film/short-path evaporator combination; however, these methods are complex and are associated with losses in yield. The simple reaction with small amounts of alcohol (here 2-ethylhexanol) leads to the desired results while avoiding the disadvantages of the known processes.

What is claimed is:

1. A process for preparing carbodiimides of formula (I)

$$R^{III}\text{—}(\text{—}N{=}C{=}N\text{—}R^{I}\text{—})_n\text{—}N{=}C{=}N\text{—}R^{II}, \quad (I)$$

in which n is a number from 1 to 500, $R^I$ is $C_1$-$C_{24}$ alkylenes and/or $C_5$-$C_{12}$ cycloalkylenes, $C_1$-$C_{12}$-alkyl-substituted or $C_1$-$C_{24}$-oxyalkyl-substituted cycloalkylenes, $C_1$-$C_{12}$-alkyl-substituted arylenes, $C_1$-$C_{24}$-oxyalkyl-substituted arylenes, $C_7$-$C_{18}$-alkylaryl-substituted arylenes and optionally $C_1$-$C_{12}$-alkyl-substituted arylenes bridged via $C_1$-$C_8$alkylene groups and having a total of 8 to 30 carbon atoms, and arylene and $R^{II}$, $R^{III}$ identically or independently of one another are $C_1$-$C_{24}$-alkyl- and/or $C_5$-$C_{24}$-cyclo- or $C_1$-$C_{12}$-alkyl-substituted or $C_1$-$C_{24}$-oxyalkyl-substituted cycloalkyls, $C_1$-$C_{12}$-alkyl-substituted or $C_1$-$C_{24}$-oxyalkyl-substituted aryls, $C_7$-$C_{18}$-alkylaryl-substituted aryls and optionally $C_1$-$C_{12}$-alkyl-substituted aryls bridged via $C_1$-$C_8$alkylene groups and having a total of 8 to 30 carbon atoms, and aryl, comprising the steps of:

a) carbodiimidizing isocyanates in the presence of a catalyst to give a reaction mixture comprising the carbodiimide of formula (I) and residual monomeric isocyanate, b) separating at least partially the catalyst and/or the residual monomeric isocyanate from the reaction mixture comprising the carbodiimide of formula (I) and the residual monomeric isocyanate by distillation or extraction to obtain a crude carbodiimide of the formula (I) comprising residual monomeric isocyanate, and c) adding one or more alcohols to the crude carbodiimide of the formula (I) to partially or completely react the one or more alcohols with the residual monomeric isocyanate of the crude carbodiimide.

2. The process according to claim 1, wherein in step c), based on the amount of the crude carbodiimide of the formula (I) present, 0.1%-5% by weight of the one or more alcohols is added.

3. The process according to claim 1, wherein the adding and/or the partial or complete reaction of the one or more alcohols in step c) is effected at temperatures in the range from 140-200° C.

4. The process according to claim 1, wherein the one or more alcohols are aliphatic and/or aromatic alcohols.

5. The process according to claim 1, further comprising the step of filtering the reaction mixture product from step a) between step a) and step b).

6. The process according to claim 1, wherein the addition and/or reaction in step c) is effected while stirring.

7. The process according to claim 1, wherein the carbodiimides correspond to formula (II), (II)

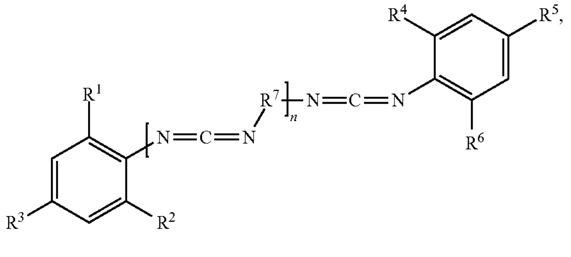

in which $R^1$, $R^2$, $R^3$, $R^4$, $R^5$ and $R^6$ identically or independently of one another are H, $C_1$-$C_{20}$ alkyl, $C_3$-$C_{20}$ cycloalkyl, $C_6$-$C_{15}$ aryl and/or $C_7$-$C_{15}$ aralkyl, $R^7$=$C_1$-$C_{18}$ alkylene, $C_5$-$C_{18}$ cycloalkylene, $C_1$-$C_{20}$-alkyl-substituted arylene and/or $C_7$-$C_{18}$ aralkylene.

8. The process according to claim 7, wherein n is a number in the range from 1 to 50.

9. The process according to claim 1, wherein the distillation in step b) is effected at temperatures of from 140° C. to 200° C.

10. The process according to claim 1, wherein the distillation in step b) is conducted at a pressure of from 0.1 to 50 mbar.

11. The process according to claim 1, wherein the catalyst in step a) is selected from the group consisting of phospholene oxides, phospholidines, phospholine oxides, and also the sulfides thereof, tertiary amines, basic metal compounds, alkali metal oxides, alkali metal hydroxides, alkaline earth metal oxides, alkaline earth metal hydroxides, alkoxides, phenoxides, metal carboxylates and non-basic organometallic compounds.

12. The process according to claim 1, wherein the step of carbodiimidizing occurs in the presence of a solvent.

13. The process according to claim 1, wherein the isocyanates used are 1,3,5-triisopropylphenyl diisocyanate (TRIDI), 2,6-diisopropylphenyl isocyanate (DIPI) and/or 2,4,6-triisopropylphenyl isocyanate (TRIPI).

14. The process according to claim 1, further comprising the step of removing excess alcohol by distillation following step c).

15. The process according to claim 1, wherein, after step c), the carbodiimides of formula (I) are obtained having a content of less than 1000 ppm of the residual monomeric isocyanate.

* * * * *